United States Patent [19]

Cole

[11] Patent Number: 4,757,635
[45] Date of Patent: Jul. 19, 1988

[54] DEPTH-CHANGING FISHING FLOAT

[76] Inventor: Michael A. Cole, 730 Hill St., Apt. C, Forest Park, Ga. 30050

[21] Appl. No.: 42,029

[22] Filed: Apr. 24, 1987

[51] Int. Cl.⁴ .............................................. A01K 93/00
[52] U.S. Cl. .................. 43/44.88; 43/44.91; 43/17.5
[58] Field of Search .............. 43/44.88, 17.5, 44.87, 43/44.91

[56] References Cited

U.S. PATENT DOCUMENTS

| | | | |
|---|---|---|---|
| 2,153,869 | 4/1939 | Jones | 43/49 |
| 2,269,615 | 1/1942 | Walker | 43/49 |
| 2,597,737 | 5/1952 | Kay et al. | 43/44.88 |
| 2,609,634 | 9/1952 | Simpson | 43/44.88 |
| 2,777,238 | 1/1957 | Taylor et al. | 43/44.9 X |
| 2,785,499 | 3/1957 | Simpson | 43/44.88 |
| 2,861,382 | 11/1958 | Rosenberg | 43/44.91 |
| 2,888,771 | 6/1959 | Stephens et al. | 43/41.2 |
| 3,106,797 | 10/1963 | Hancock | 43/43.11 |
| 3,168,790 | 2/1965 | Creasey | 43/43.11 |
| 3,341,965 | 9/1967 | Purcella | 43/43.11 |
| 3,370,376 | 2/1968 | Winn | 43/44.91 X |
| 3,425,151 | 2/1969 | Salfer | 43/43.11 |
| 3,443,336 | 5/1969 | Reese | 43/44.88 |
| 3,667,149 | 6/1972 | Daigle | 43/43.15 |
| 3,694,951 | 10/1972 | Modeme | 43/41.2 |
| 3,760,527 | 9/1973 | Hamren | 43/44.88 |
| 3,800,461 | 4/1974 | Jacobi | 43/44.88 |
| 3,875,695 | 4/1975 | Futch, Jr. | 43/44.88 |
| 4,571,874 | 2/1986 | Smaw | 43/44.91 X |

Primary Examiner—Nicholas P. Godici
Assistant Examiner—Carmine Cuda
Attorney, Agent, or Firm—Jones, Askew & Lunsford

[57] ABSTRACT

A fishing float comprising a rotatably mounted hollow tube suspended above an upper cavity in a buoyant base, wherein a buoyant arm is attached to a pivotably mounted locking mechanism comprising a brake shaft having a central opening. The mechanism is locked and unlocked by rotation of the brake shaft which aligns or misaligns the central opening with respect to the path of a fishing line. The float can be used to change the depth of the fishing line within the water either a predetermined distance to effect jigging or an indefinite distance depending on the orientation of the hollow tube.

14 Claims, 6 Drawing Sheets

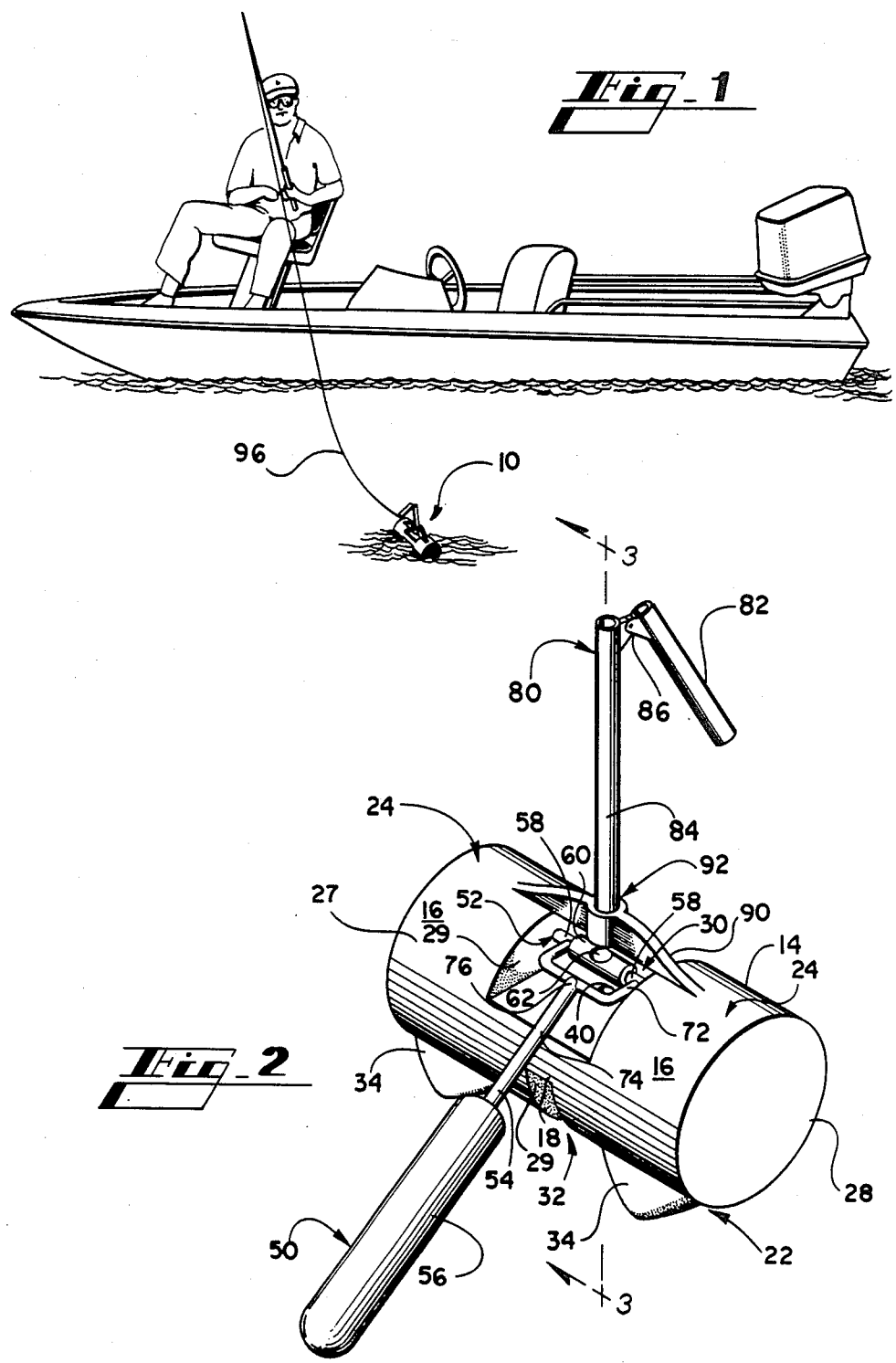

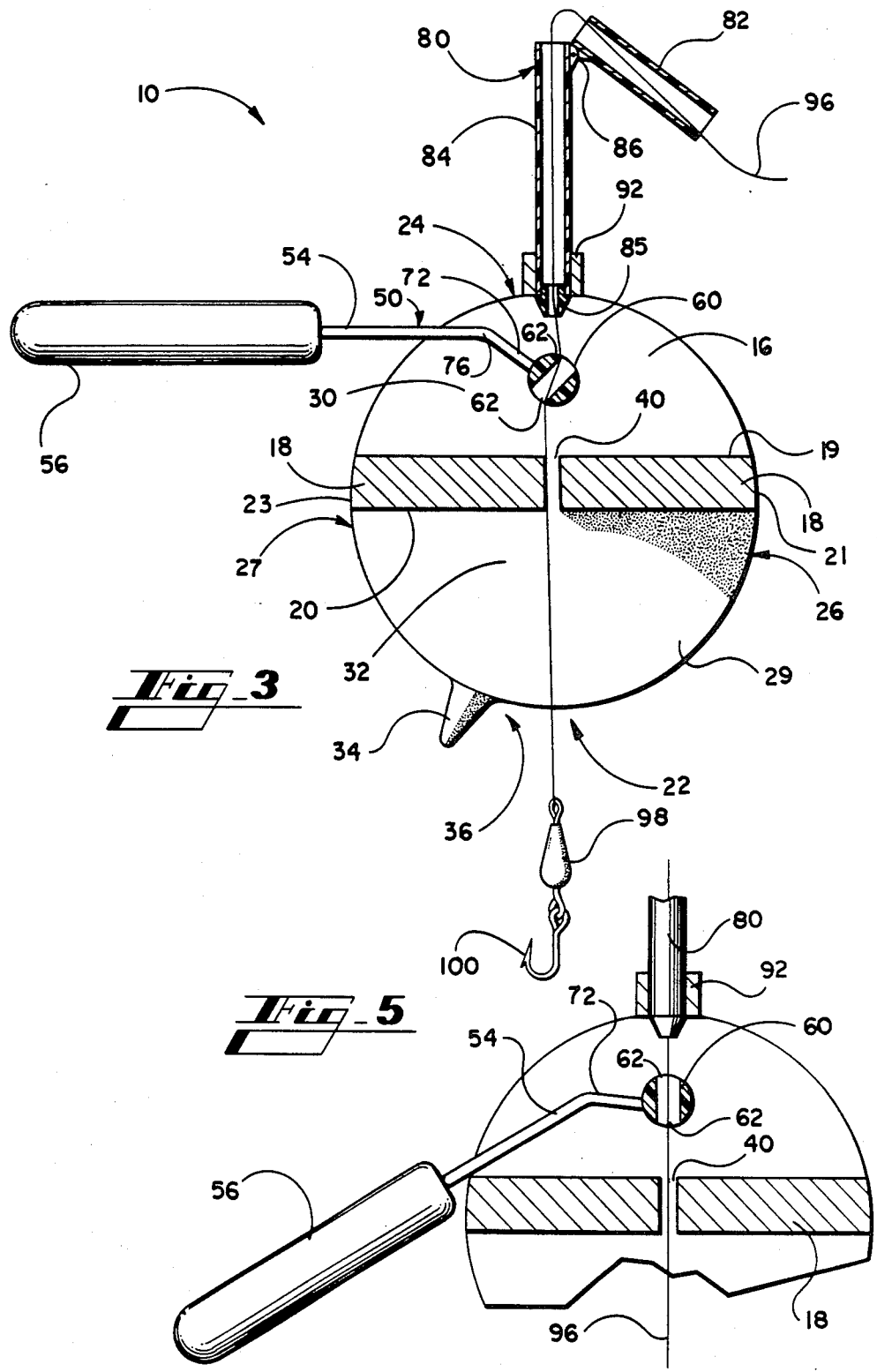

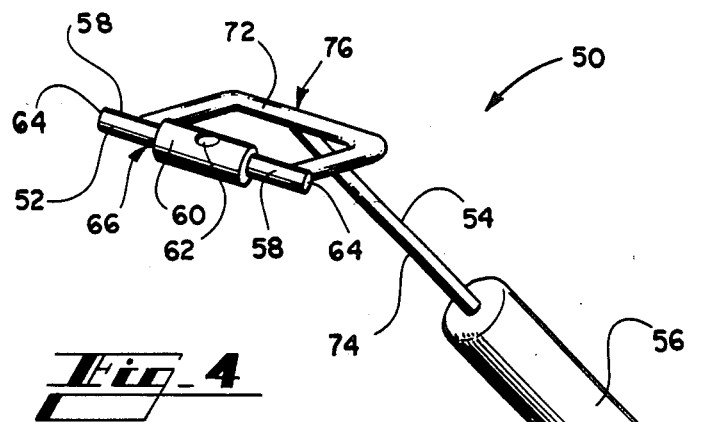
Fig_4
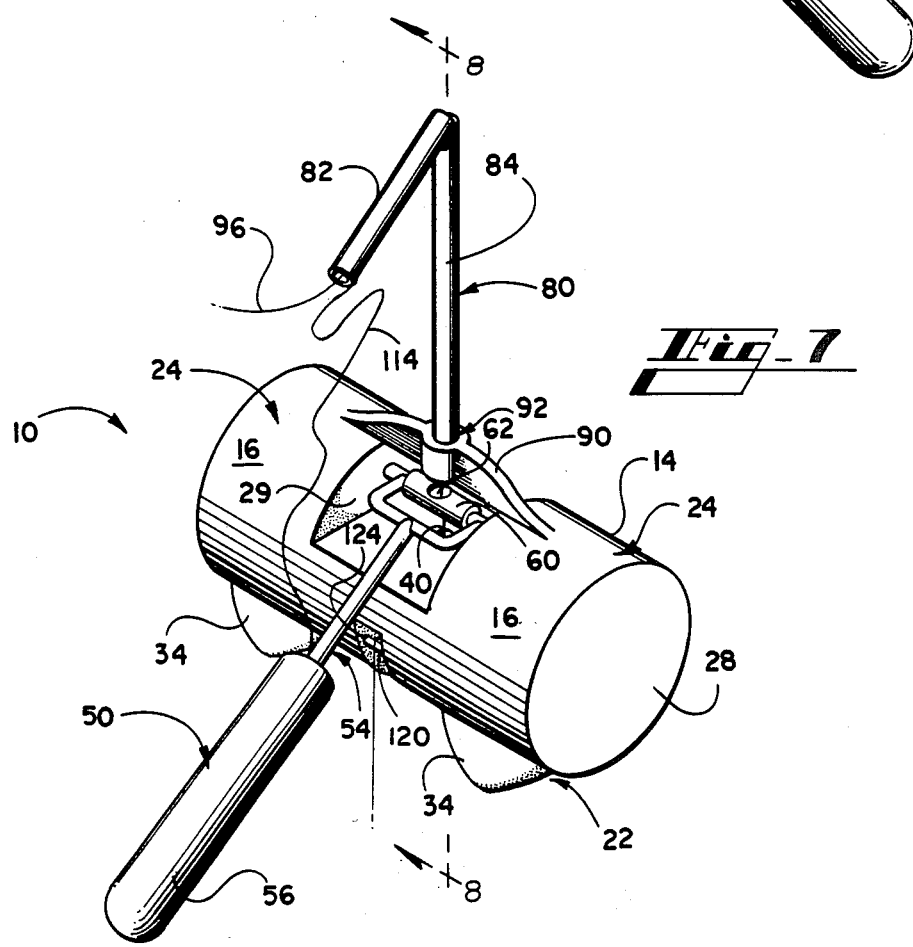
Fig_7

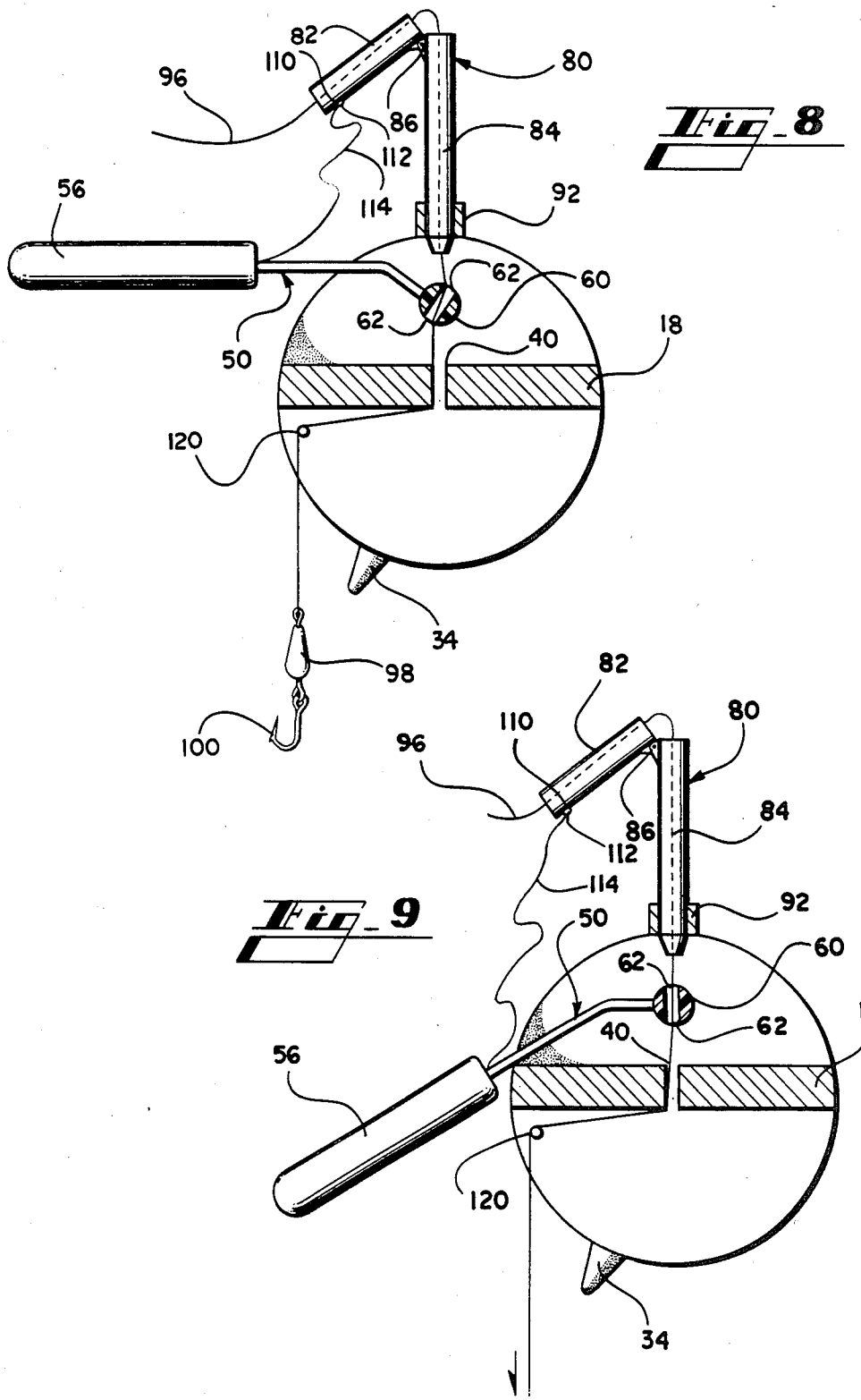

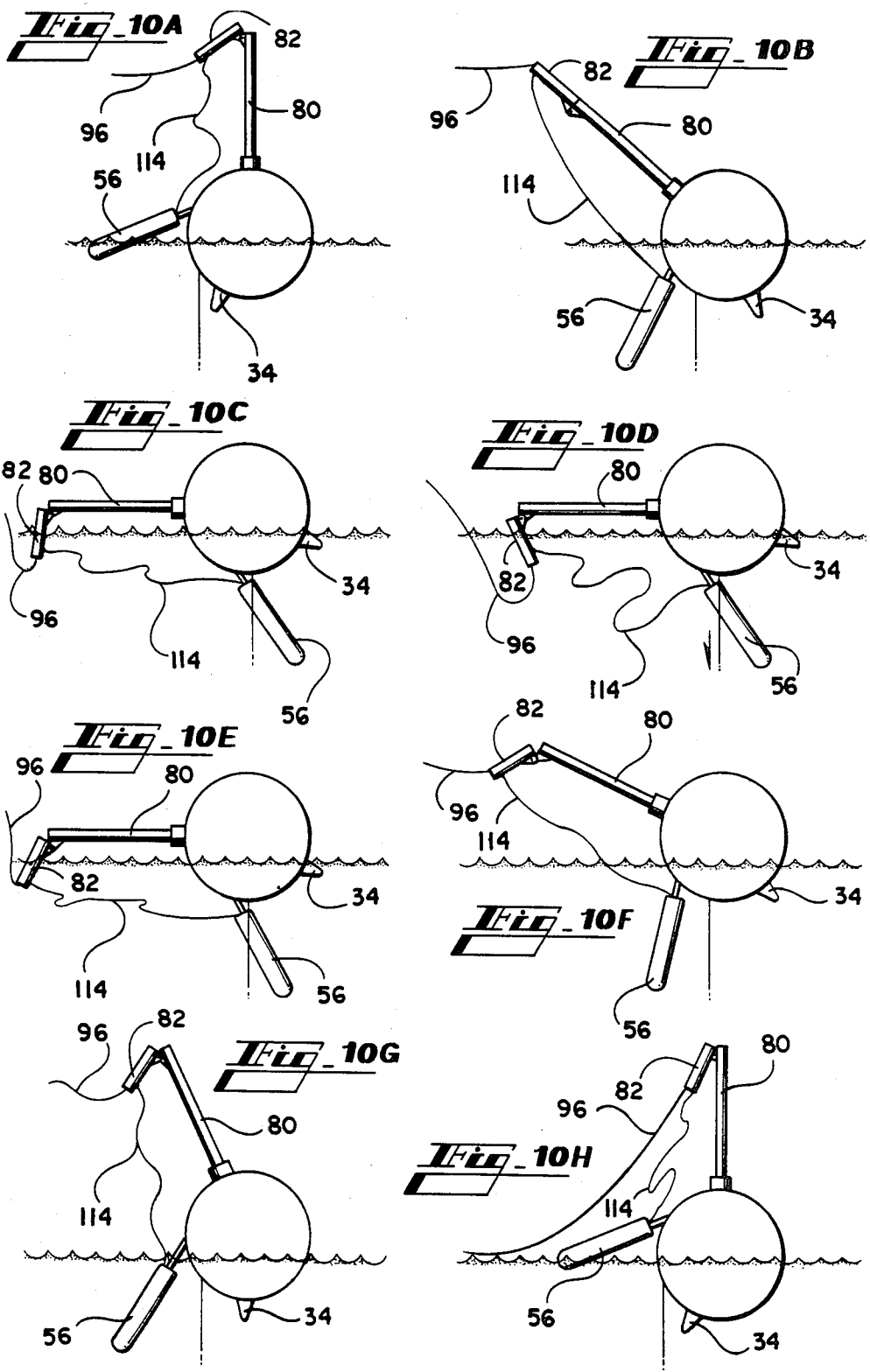

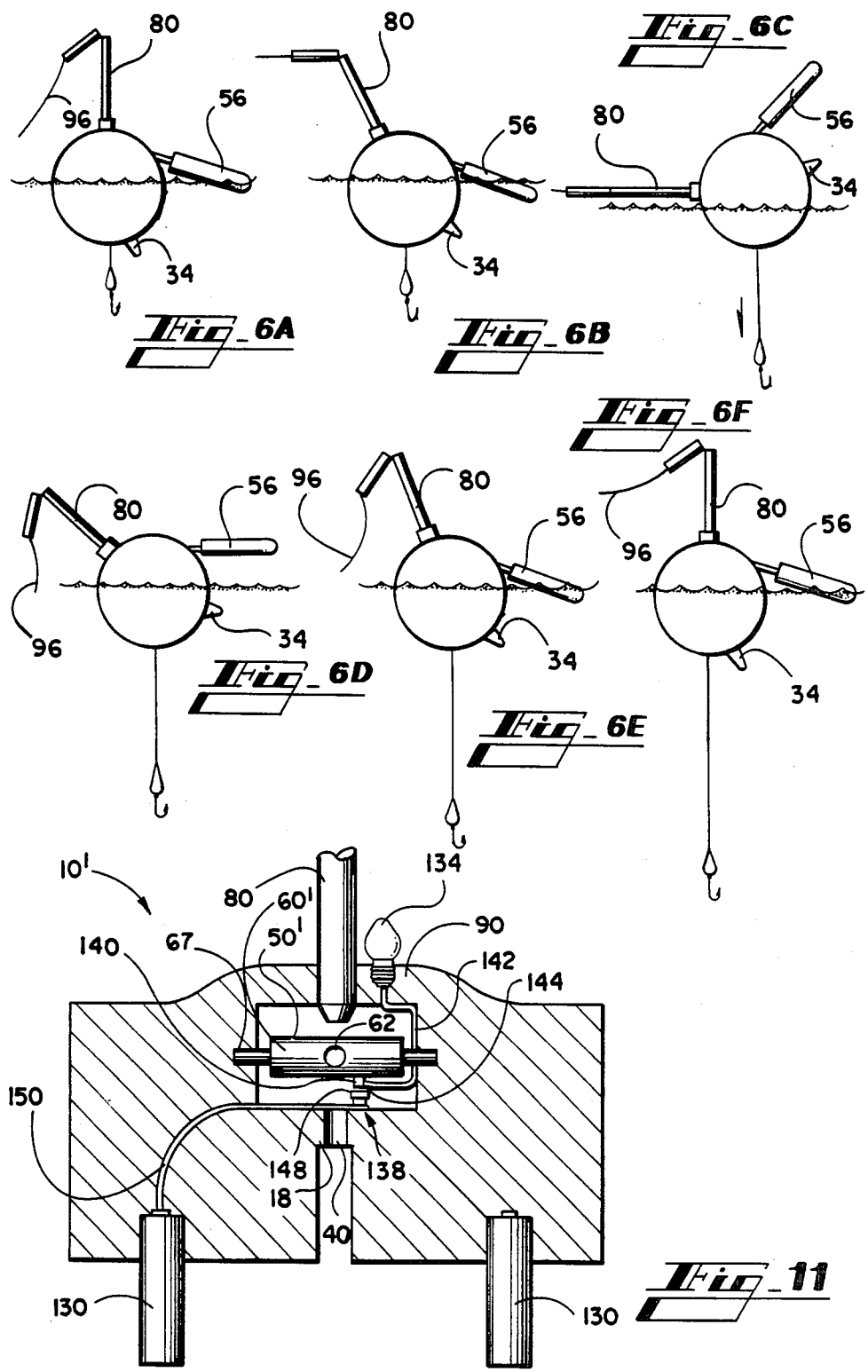

DEPTH-CHANGING FISHING FLOAT

TECHNICAL FIELD

The present invention relates to a fishing float which enables the fisherman to raise and lower the fishing hook at a distance removed from the end of the fishing rod without recasting, and more specifically relates to a fishing float having a line locking means which is controllable from a distance.

BACKGROUND ART

A fishing float is a buoyant device that is attached to a fishing line a certain distance above the hook and sinker. The fishing float is cast into the water with the fishing line to provide a predetermined length of line extending from the float to a baited hook. This disposes the bait at a desired water depth.

Fishermen often use a technique known as "jigging" to attract fish. This technique involves submerging the hook and bait in the water while gently jerking the fishing line to raise and lower the hook and bait. Apparently, this action causes the bait to simulate live movement as if the bait was engaged in finding small pieces of food for itself. It is believed that this activity is appealing to the fish and encourages the fish to bite.

Normally, jigging is performed from the side of a boat or at a short distance from shore without using a fishing float. The fisherman must be able to control the hook from a position perpendicular to the surface of the water, where the line enters the water, in order to jig the line effectively. If the line is some distance away from the end of the fishing rod, the fisherman cannot cause the rapid vertical movement of the line necessary for jigging.

There are several disadvantages to jigging from the side of a boat. First of all, fish are oftentimes located in an area inaccessible to the boat. The fisherman might be able to cast his line into such areas, but then jigging cannot be performed. Second, fish are reluctant to approach the waters immediately surrounding a boat because they are wary of the noises inadvertently made by the fisherman. The fisherman can cast his line away from the boat, but again this precludes jigging.

There is also a disadvantage involved with jigging from the shore. The waters close to the shore are normally quite shallow, too shallow to accommodate fish of a size acceptable to the fisherman. The fisherman can cast his line out into the deeper water with a rod and reel, but once again this prevents effective jigging.

Jigging from a distance has been accomplished, to some extent, with a device known as a "bottom walker". This device is a sinker which bounces as it is pulled along the bottom of a lake or stream. The hook, trailing along behind the sinker, moves up and down causing the "jigging" motion.

The disadvantage of the bottom walkers is that they frequently become entangled with the vegetation and debris located on the floor of the lake or stream and the line must be cut to release the rod. Occasionally, the hook can be pulled free if the boat is moved to a place beyond where the line entered the water and the line is pulled; however, repetition of this procedure is extremely aggravating. For this reason, the bottom walker is unacceptable to many fisherman.

Certain fish, such as crappies, will not move very far to catch their food. These fish become especially lethargic when the water temperature drops below 50° F. Depending on the depth of the lake, these fish often suspend anywhere from ten to forty feet from the surface. Under these circumstances, the bait must be placed at the correct depth, immediately in front of the fish. The best way to determine the correct depth of the fish is to repeatedly cast lines of varying lengths so that the bait is dropped to all of the different depths. This method of locating fish can be extremely laborious and time consuming.

Devices are available which allow for depth adjustments without the need for recasting, but these devices are unnecessarily complex making them large and impractical. It is important to use a fish float which offers a very slight resistance to feeding fish. A large float tends to spook the bigger, more cautious fish; for this reason the devices currently available are generally unsuccessful.

Therefore, a fishing device is needed that will enable the fisherman to perform jigging from a distance. A device is also needed that will allow the fisherman to adjust the depth of the fishing hook without recasting. Ideally, a device that performs both functions is necessary.

SUMMARY OF THE INVENTION

In accordance with the present invention, a fishing float is provided which allows the fisherman to adjust the depth of the hook in the water from a distance. Furthermore, the fishing float of the present invention permits jigging even when the hook is cast at a distance removed from the boat or shore.

The present invention comprises a fishing float which is attached to a fishing line. The fishing float comprises a buoyant base with a cavity in its upper portion. Weights are mounted to the lower portion of the base so that the base tends to float in an upright position. A hollow tube is suspended vertically on the float above the cavity to guide the fishing line into a locking mechanism which is pivotably mounted within the cavity.

The locking mechanism is normally in a locked position wherein it engages the fishing line preventing upward or downward movement of the fishing line. When a pulling force is exerted on the fishing line by a fisherman, the locking mechanism becomes released, allowing the fishing line to be reeled in to a lesser depth or to sink to a greater depth by the force of gravity.

In the present invention, the locking mechanism comprises a brake shaft, mounted within the cavity, so that the brake shaft is substantially perpendicular to the hollow tube. An opening passing through the brake shaft perpendicular to the axis of pivot is normally out of alignment with respect to the hollow tube when the locking mechanism is in the locked position. When a pulling force is exerted on the fishing line by the fisherman, the opening comes into alignment with the hollow tube allowing the fishing line to pass through the opening freely.

The locking mechanism also includes a buoyant arm mounted to the brake shaft in such a way that the arm floats in a position which forces the opening out of alignment with respect to the hollow tube, and places the brake shaft in the locked position. When a pulling force is exerted on the fishing line by the fisherman, the buoyant base deviates from its upright attitude forcing the buoyant arm to assume a different position relative to the buoyant base which places the brake shaft in an unlocked position.

Accordingly, it is an object of the present invention to provide a fishing float which allows the fisherman to raise or lower the submerged hook without recasting the line.

Another object of the present invention is to provide a fishing float with a simplified line locking and unlocking mechanism.

Another object of the present invention is to provide a fishing float with a line locking and unlocking mechanism which is practical Another object of the present invention is to provide a relatively small fishing float having a line locking and unlocking mechanism.

Another object of the present invention is to provide a fishing float having a line locking and unlocking mechanism which does not spook fish.

Another object of the present invention is to provide a fishing float which enables the fisherman to conduct jigging from a distance.

Another object of the present invention is to provide a fishing float which enables the fisherman to perform jigging from a distance without repeatedly entangling the line.

Another object of the present invention is to provide a fishing float which enables a fisherman to either perform jigging from a distance or to change the depth of the hook from a distance by making slight modifications to the float.

These and other objects, features and advantages of the present invention will become apparent after a review of the following detailed description of the disclosed embodiment and the appended claims.

BRIEF DESCRIPTION OF THE DRAWING

FIG. 1 is a pictorial view of a fisherman utilizing the first preferred embodiment of the present invention.

FIG. 2 is an enlarged pictorial view of a first preferred embodiment of the present invention shown in the unlocked position.

FIG. 3 is a transverse vertical cross-sectional view of the embodiment shown in FIG. 2, taken along line 3—3 of FIG. 2, showing the embodiments in the locked position.

FIG. 4 is a pictorial view of the locking mechanism of the embodiment shown in FIG. 2.

FIG. 5 is a partial view as in FIG. 3, showing the embodiment in the unlocked position.

FIGS. 6(a) (b) (c) (d) (e) and (f) are a sequence of stick drawings showing the mechanism of action of the embodiment shown in FIG. 2.

FIG. 7 is a pictorial view of a modified version of the embodiment shown in FIG. 2, showing the embodiment in the unlocked position.

FIG. 8 is a transverse vertical cross-sectional view of the modified embodiment shown in FIG. 7, taken along line 8—8 of FIG. 7, showing the embodiment in the locked position.

FIG. 9 is a view as in FIG. 8, showing the embodiment in the unlocked position.

FIGS. 10 (a) (b) (c) (d) (e) (f) (g) and (h) are a sequence of stick drawings showing the mechanism of action of the embodiment shown in FIG. 7.

FIG. 11 is a longitudinal vertical cross-sectional view of a second embodiment of the present invention.

DETAILED DESCRIPTION

Referring now in more detail to the drawings, in which like numerals refer to like parts throughout the several views, FIG. 1 shows a first preferred embodiment of the fishing float 10 of the present invention being used by a fisherman. As best shown in FIGS. 2 and 3, the first preferred embodiment of the fishing float 10 includes a buoyant base 14 which is cylindrical in shape. The base is preferably made out of a buoyant material such as polystyrene foam, lightweight wood or plastic. Alternatively, the base 14 could be molded from plastic and sealed in such a way that air pockets creating positive floatation are formed.

The base 14 is formed from a pair of identical, longitudinally oriented cylinders 16 closed at both ends and connected by a bridge 18. Each of the cylinders 16 defines a lower portion 22, an upper portion 24, a front 26 and a back 27. Each cylinder also defines an outer flat surface 28 and an inner flat surface 29. The bridge 18 is a rectangular block which defines an upper surface 19, a lower surface 20, a front surface 21 and a back surface 23.

An upper cavity 30 is defined by the upper surface 19 of the bridge 18 and the inner flat surface 29 of each cylinder 16. A lower cavity 32 is defined by the lower surface 20 of the bridge 18 and the inner flat surface 29 of each cylinder. A pair of weights 34, preferably made from lead, are attached to the lower portion 22 of the each cylinder at 36 so that the weights lie parallel to one another. The weights 34 are positioned at 36, slightly behind the central vertical axis of the base 14, to preload locking pressure on a locking mechanism which will be described below.

The upper cavity 30 aids in reducing the weight of the upper portion of the fishing float 10, allowing the smallest possible weights 34 to counterbalance the float, keeping it in an upright position with respect to the surface of the water. Furthermore, the lower cavity 32 aids in reducing the weight of the lower portion of the fishing float 10, causing the majority of the weight of the buoyant base 14 to be concentrated near the bridge 18. This causes the center of pivot of the fishing float 10 to exist in proximity to a locking mechanism (described below), thus aiding the locking and unlocking of the mechanism. The upper and lower cavities 30 and 32 also assist in reducing the overall weight of the fishing float 10, facilitating the casting and reeling of the float.

A cylindrical opening 40 passes through the center of the bridge 18 of the base 14. The opening therefore opens into both the upper cavity 30 and the lower cavity 32. The opening 40 must have a diameter large enough to allow a fishing line to pass through freely as the line is moved up and down within the opening. Preferably the diameter of the opening 40 is small enough to guide the fishing line through another opening as described below.

The longitudinal width of the lower cavity 32, defined by the distance between the inner flat surfaces 29 of each cylinder 16 below the bridge 18 should be minimized so that the base 14 contains as much buoyant material as possible, enabling the fishing float 10 to maintain maximal floatation capacity. The width of the lower cavity 32 need only be wide enough to allow unimpeded passage of the fishing line. Therefore, the width of the lower cavity 32 is preferably equal to the diameter of the opening 40 in the bridge 18.

A locking mechanism 50 is pivotally mounted within the upper cavity 30. As best shown in FIG. 4, the locking mechanism is defined by a brake shaft 52 connected to a Y-shaped handle 54 upon which is mounted a buoyant arm 56. The brake shaft 52 is defined by a pair of axles 58 connected by a sleeve 60. Preferably, the axles 58 are made of a lightweight material such as plastic. The sleeve 60 is a hollow tube constructed from a small piece of flexible tubing such as latex or rubber tubing. The inner diameter of the sleeve 60 should be smaller than the outer diameter of each axle 58 so that the splined axles may be tightly inserted into the ends of the sleeve as described below.

The sleeve 60 defines a pair of openings 62 which are oppositely disposed at the center of the sleeve. The diameters of the sleeve openings 62 within the sleeve 60 are large enough to allow a fishing line to pass through and are slightly larger than the diameter of the bridge opening 40 so that the small bridge opening 40 guides the fishing line through the center of the sleeve openings 62, preventing contact between the fishing line and the edges of the openings 62.

Each axle 58 defines a journal 64 at the outermost end, and the innermost end (not shown) can be splined to facilitate secure insertion into the sleeve. The splined innermost end of each axle 58 is inserted into the sleeve 60 to a depth such that the axle 58 is securely held by the flexible tubing of the sleeve, but not so far as to obstruct the sleeve openings 62. The journal 64 of each axle 58 is inserted into a bearing 67 (shown best in FIG. 11) located on the inner flat surface 29 of each cylinder 16 so that the journal 64 turns within the bearing 67, enabling the entire brake shaft 52 to pivot. The bearing 67 is located in a position such that the sleeve openings 62 in the sleeve 60 are directly above the bridge opening 40 in the bridge 18. Furthermore, the sleeve openings 62 are vertically aligned with the bridge opening 40 when the locking mechanism 50 is in the unlocked position as shown in FIG. 2.

Preferably, the entire brake shaft 52, with the exception of the sleeve 60, is injection molded from a single piece of plastic in the following manner to ensure that the handle does not interfere with the pivoting mechanism. The Y-shaped handle 54 defines a forked end 72 extending from one end of a post 74. The forked end 72 of the handle 54 is molded to the axles 58 of the brake shaft 52 and the buoyant arm 56 is molded to the other end of the post 74 of the Y-shaped handle 54.

Preferably, the Y-shaped handle 54 is bent inwardly at 76 where the forked end 72 meets the post 74 so that the forked end 72 and the post 74 lie approximately 60° apart. This bend in the handle 54 places the buoyant arm 56 in a better position for locking and unlocking the locking mechanism 50 as described below.

As may be seen from FIGS. 2, 3, and 5, the preferred embodiment of the present invention includes a hollow tube 80 which is suspended over the upper cavity 30 of the base 14 so that the hollow tube 80 is centrally disposed over the upper cavity 30. The hollow tube 80 defines an upper portion or member 82 hinged to a lower portion or member 84. The hinge 86 is in the closed position when the upper member 82 is linearly aligned with the lower member 84. The hollow tube 80 is suspended over the upper cavity 30 in such a way that, when the hinge 86 is in the open position, the upper member 82 faces in a direction away from the buoyant arm 56. The lowermost tip 85 of the tube 80 can be tapered for a purpose which will be described below.

The hollow tube 80 is suspended over the upper cavity 30 by a tube-supporting bridge 90. The tube supporting bridge 90 spans the upper cavity 30 and is mounted to the upper portions 24 of the two cylinders 16 of the base 14, further connecting the two cylinders 16. The center of the tube-supporting bridge 90 defines a tube bearing 92 into which the hollow tube 80 is rotatably mounted. The hollow tube 80 can be rotated within the tube bearing 92 to achieve a modified version of the first preferred embodiment of the present invention which will be described in more detail below.

The tube bearing 92 is aligned above the bridge opening 40 in the bridge 18. When the hollow tube 80 is placed within the tube bearing 92 as shown in FIGS. 2, 3 and 5, the lowermost tip 85 of the lower member 84 of tube is also aligned above the bridge opening 40 in the bridge 18. The sleeve openings 62 in the brake shaft 52 only become aligned between the bridge opening 40 and the lowermost tip 85 of the tube 80 when the locking mechanism 50 is in the unlocked position as shown in FIGS. 2 and 5. As shown in FIG. 3, the sleeve openings 62 are not aligned with either the bridge opening 40 or the lowermost tip 85 of the tube 80 when the locking mechanism 50 is in the locked position.

As shown in FIGS. 3 and 5, a fishing line 96 is inserted into the upper member 82 of the hollow tube 80 and is threaded down through the lower member 84, emerging from the lowermost tapered tip 85 into the upper cavity 30. The fishing line 96 is further threaded through the sleeve openings 62 in the brake shaft 52 and through the bridge opening 40 into the lower cavity 32 so that the fishing line descends vertically from the base 14 to the depths of the body of water into which the fishing float 10 is cast. The tapering of the lowermost tip 85 helps to position the line 96 in the center of the sleeve openings 62. Preferably, the tapered tip 85 has a diameter equal to the diameter of the bridge openings 40 so that the fishing line is guided by both the tapered tip 85 and the bridge opening 40. This assures that the fishing line does not contact the inner surface of the sleeve openings 62 while the fishing float 10 is in the unlocked position and facilitates the movement of the fishing line. A sinker 98 is attached to the line in proximity to the hook 100 to ensure that the fishing line 96 will be pulled by the force of gravity in a downward direction thus discouraging entanglement with the weights 34 and buoyant arm 56.

The lower cavity 32 aids in the positioning of the exit point of the fishing line 96 with respect to the center of pivot of the fishing float 10 so as to prevent the sinker 98 from being lifted whenever the fishing float 10 is tilted to assume a horizontal position as described below. Without the lower cavity 32 allowing free movement of the fishing line 96 directly from the bridge opening 40 into the depth of the water, the cylinder 16 would act as a windlass to the fishing line 96 causing an undesired shortening of the line and interfering with the upward or downward movements of fishing line 96.

Turning now to FIG. 6, the first preferred embodiment of the present invention is used to achieve the fishing technique of jigging in the following manner. FIG. 6(a) shows the fishing float 10 after it has been cast into the water. The upper member 82 must be directed toward the fisherman. The fishing line 96 is slack, and the fishing float 10 is oriented vertically with respect to the surface of the water. The buoyant arm 56 is horizontally oriented as it floats upon the surface of the water causing the brake shaft 52 to assume the locked position. If the upper member 82 of the hollow tube 80 is not directed toward the fisherman, a gentle tug on the fishing line 96 will rotate the fishing float 10 so that it is properly oriented.

As shown best in FIG. 3, when the buoyant arm 56 is horizontally oriented, it rotates the brake shaft 52 to a position wherein the sleeve openings 62 are not aligned with respect to both the lowermost tip 85 of the tube 80 and the bridge opening 40. This misalignment causes the fishing line 96, passing through the series of tubes 82 and 84 and openings 62 and 40, to frictionally rub against the sleeve 60. The rubber composition of the sleeve 60 increases the friction between the line 96 and the sleeve 60 preventing movement of the fishing line 96 through the sleeve opening 62. The frictional force is so great that even the weight of the sinker 98, attached to the end of the fishing line 96 cannot pull the fishing line through the sleeve openings 62. Thus the brake shaft is in the locked position when the sleeve openings 62 are not aligned with the lowermost tip 85 of the tube 80 and the bridge opening 40, preventing the movement of the fishing line 96 up or down.

The locking mechanism 50 is placed in an unlocked position, as shown best in FIG. 5, by exerting a quick, light jerk upon the fishing line 96. This jerk on the line by the fisherman causes the fishing float 10 to be tilted forward as shown in FIG. 6(b) until the fishing float 10 is lying horizontally upon the surface of the water with the buoyant arm 56 above the surface of the water as shown in FIG. 6(c). As the buoyant arm 56 is removed from the surface of the water, it is pulled downwardly by the force of gravity. The downward movement of the buoyant arm 56 causes the rotation of the brake shaft 52 which, in turn, causes the sleeve openings 62 to become aligned with the lowermost tip 85 of the tube 80 and the bridge opening 40. When the sleeve openings 62 are aligned, as shown best in FIG. 5, the fishing line 96 does not rub against the sleeve 60, and there is therefore no friction between the sleeve 60 and the fishing line 96 to prevent the ascent or descent of the fishing line. Thus the locking mechanism is placed in the unlocked position. At this point, the fisherman can give slack to the fishing line 96 allowing the line to descend. If the fisherman wishes to raise the hook 100 to a lesser depth, he simply reels in the line. The action of reeling causes the float to tilt toward him, placing the fishing float 10 in the semi-unlocked position shown in FIG. 6(b). This semi-unlocked position permits the fishing line 96 to be pulled through the sleeve openings 62 with only slight resistance.

It will be understood by those skilled in the art that the fishing float 10 will only remain in the unlocked position shown in FIG. 6(c) for a short while. The force of gravity upon the weights 34 will quickly restore the fishing float 10 to its upright and locked position, as shown in FIGS. 6(d) (e) and (f), as long as the fishing line 96 is allowed to remain slack. Therefore, only a predetermined length of the fishing line 96 will pass through the sleeve openings 62 before the locking mechanism 50 relocks, allowing the line to descend only approximately seven inches. However, the fisherman can repeatedly jerk the fishing line 96 to cause the locking mechanism to unlock and lock, sending the fishing line to the desired depth while simultaneously causing the jigging motion.

The existence of the upper cavity 30 allows the sleeve 60 of the brake shaft 52 to be located very near to the center of pivot of the fishing float 10, thus allowing the smallest possible weights 34 to return the fishing float 10 from the horizontal and unlocked position shown in FIG. 6(c) to its upright and locked position, shown in FIG. 6(f).

It will be understood by those skilled in the art that the depth to which the line 96 will descend for each depth change, using optimal sinker weight, depends upon such factors as the ambient temperature, the temperature of the water, the limpness of the fishing line 96 and the dexterity and skill of the fisherman. Cold temperatures will cause the line 96 to become stiff, hindering the passage of the line through the hollow tube 80 and the unlocked locking mechanism 50. Warm temperatures allow the line 96 to remain limp so that passage of the line through the hollow tube 80 and the unlocked locking mechanism 50 is unimpeded.

The jigging motion is created by the bouncing movement of the buoyant base 14 which is transmitted to the sinker 98 and hook 100 as follows: Each time the fishing float 10 relocks, the momentum of the descending sinker 98 pulls the base 14 slightly below the surface of the water until the buoyant forces of the base 14 return the float 10 to the surface of the water. Thus the sinker 98 drops to a lower position when the locking mechanism 50 is unlocked and continues to drop slightly even after the locking mechanism 50 is relocked pulling the base 14 below the water's surface. The rapid return of the base 14 to the surface of the water imparts a bouncing action to the sinker 98 which resembles the actions of live bait.

It will be obvious to those skilled in the art that the hinged hollow tube 80 of the first preferred embodiment could be replaced with a bent hollow tube (not shown). The bend, anywhere in the tube, assures that the fishing float 10 will be in the proper orientation with respect to the fisherman for purposes of jigging and finite depth changes as described above.

The bend in the tube serves the same purpose as the hinge 86, in that a gentle pull on the fishing line causes the fishing float to rotate upon the surface of the water until the upper portion above the bend is facing toward the fisherman and the buoyant arm 56 faces away from the fisherman as described above.

The bent tube 80 is not recommended when the modified version of the first preferred embodiment (described below) is employed. The hinge 86 performs an additional function for the modified version in that it aids the fisherman in moving the fishing float 10 from the unlocked position to the locked position as described below.

FIGS. 7 and 8 show a modified version of the first preferred embodiment of the present invention. This modified version of the fishing float 10 is used by a fisherman to infinitely change the depth of the fishing line 96 with one jerk on the line.

The fishing float 10 of the first preferred embodiment is modified by first rotating the hollow tube 80 approximately 180° within the tube bearing 92. This causes the upper member 82 of the tube to lie in a plane above the buoyant arm 56. Second, a socket 110 is mounted to the outermost end of the upper member 82 of the hollow tube 80 so that the socket faces the buoyant arm 56. One end of a short piece of thread 114, preferably made from fishing line material, is removably secured within the socket 110 by a snap-in means such as a ball 112. The opposite end of the thread 114 is secured to the handle 54 of the locking mechanism 50 at the point where the handle becomes the buoyant arm 56. The thread 114 may be secured to the handle 54 by similar snap fasteners formed from a socket 110 and ball 112.

The third modification to the first preferred embodiment involves the addition of a guide pin 120. The guide pin 120 is removeably mounted between the cylinders 16 within the lower cavity 32. The ends of the guide pin 120 are matingly received into a pair of holes 124 located on the inner flat surface of each cylinder 16. The holes 124 are preferably located toward the back 27 of the base for a purpose which will be discussed below. It will be understood by those skilled in the art that the guide pin 120 may be spring loaded to facilitate easy installation and removal from the holes 124.

The fishing line 96 is essentially threaded through the fishing float 10 as described above; however, the line 96 descends from the bridge opening 40 and passes over the guide pin 120 as shown in FIGS. 8 and 9. The guide pin 120 alters the center of gravity of the fishing float for a purpose which will be described below.

Turning now to FIG. 10, the modification of the first preferred embodiment of the present invention is used to change the depth of the fishing line 96 in the following manner. FIG. 10(a) shows the modified fishing float 10 after it has been cast into the water. The fishing line 96 is slack, and the fishing float 10 is oriented vertically with respect to the surface of the water. The buoyant arm 56 is substantially horizontally oriented as it floats upon the surface of the water causing the brake shaft 52 to assume the locked position as described in detail above.

The locking mechanism 50 is placed in an unlocked position, shown in FIG. 9, in the following manner. The fisherman first pulls the fishing float 10 a short distance toward him very rapidly. This pulling motion causes the upper member 82 of the hollow tube 80 to move upwardly closing the hinge 86 as shown in FIG. 10(b). The pulling motion also causes the fishing float 10 to be tilted forward as also shown in FIG. 10(b) until the fishing float 10 is lying horizontally upon the surface of the water as shown in FIG. 10(c). As the fishing float 10 moves across the water approximately seven or eight inches toward the fisherman, the buoyant arm 56 becomes trapped beneath the float 10 rotating the brake shaft 52 to an unlocked position. Once the fishing line 96 becomes slack, the hinge 86 opens allowing the upper member 82 of the hollow tube 80 to enter the water. The forward momentum of the fishing float 10 will cause the hinge 86 to open even further, as shown in FIG. 10(d), as the upper member 82 moves against the flow of the water. The opening of the hinge 86 allows the thread 114 to become completely slack, releasing the buoyant arm 56 entirely.

The buoyant arm 56 will remain trapped beneath the fishing float 10 indefinitely, by reason of its own buoyancy, allowing the fishing line 96, now unlocked, to slip through the tube 80, the lowermost tapered tip 85 of the tube, the sleeve openings 62 and the bridge opening 40 until the hook 100 reaches the desired depth. The modified float is relocked by gently tugging the fishing line 96, as explained below. If the fisherman wishes to raise the hook 100 to a lesser depth, he simply reels in the line. The action of reeling causes the float to tilt toward him, placing the fishing float 10 in the semi-unlocked position shown in FIG. 10(f). This semi-unlocked position permits the fishing line 96 to be pulled through the sleeve openings 62 with only slight resistance. The depth of the fishing hook 100 can be determined by any method well known in the art such as counting down, markings or colorations on the fishing line 96 which the fisherman can readily observe.

The guide pin 120 aids in stabilizing the fishing float 10 in the horizontal, unlocked position by moving the center of gravity of the fishing float slightly toward the rear. The weight of the guide pin 120 plus the weight of the sinker 98 pulling on the fishing line 96 which passes over the guide pin 120 causes the change in the center of gravity of the fishing float 10. This change in the center of gravity prevents the accidental relocking of the fishing float 10 by wave action in rough water, and also allows for easier unlocking of the locking mechanism as the fishing float 10 is tilted from the vertical to the horizontal position.

To relock the modified fishing float 10, the fisherman imparts a gentle tug upon the fishing line 96. This action causes the upper member 82 of the hollow tube 80 to swing forward, removing the slack from the thread 114, as shown in FIG. 10(e). As the thread 114 is pulled taut, the buoyant arm 56 is gently drawn forward until the buoyancy of the arm is freed from beneath the fishing float 10 as shown in FIG. 10(f) and is allowed to return to the surface of the water as shown in FIGS. 10(g) and (h). Notice, in FIG. 10(g), that the fisherman, after imparting the gentle tug upon the fishing line 96, has given slack to the line 96 in order to keep the fishing float 10 at the location to which the original cast was made.

A second preferred embodiment of the present invention is shown in FIG. 11. The second embodiment incorporates an electric flash signal into the fishing float 10' to indicate to the fisherman the slightest nibble on the baited hook 100.

In the second embodiment, the weights 34 are replaced by small batteries 130 (preferably penlight batteries, size AA for larger floats or "button batteries", size A76 for smaller floats). Smaller or larger batteries can be used depending on the size and buoyancy of the fishing float 10'.

If the weight of the selected batteries 130 is insufficient to return the fishing float 10 to the upright and locked position, the batteries can be encircled by a lead shell (not shown) or placed within a lead cup (not shown) so that the desired counter-weight is achieved. A small light bulb 134 is mounted on the tube-supporting bridge 90 where it can be easily seen by the fisherman. The locking mechanism 50 is replaced with a more resilient mechanism 50' including a sleeve 60' which is longer than the sleeve 60 of the first embodiment.

An electric switch 138 is mounted beneath the locking mechanism 50' on the bridge 18 so as to not obstruct the passage of the fishing line 96 through the bridge opening 40. The electric switch 138 includes a metallic contact such as a copper staple 140 mounted to the underside of the brake shaft 52 as oriented when the locking mechanism 50' is in the locked position. One end of a predetermined length of copper wire 142 is mounted to the copper staple 140. The other end 144 of the wire 142 is attached to the light bulb 134. An adjustable screw 148 is screwed into an opening (not shown) in the bridge 18, and one end of a second predetermined length of copper wire 150 is secured to the screw 148. The other end of the second copper wire 150 is then attached to one or both batteries 130. A third wire (not shown) serves as a ground from the batteries 130 to the bulb 134.

The electric switch 138 is engaged when a fish nibbles at the baited hook 100, pulling the fishing line 96 downwardly when the locking mechanism 50' is in the locked position. The frictional forces between the fishing line 96 and the rubber sleeve 60' prevent the fishing line 96 from being pulled through the sleeve openings 62; however, the resilience of the rubber allows the center portion of the sleeve 60' to be pulled downwardly by the nibbling actions of the fish. The sleeve 60' is pulled downwardly until the copper staple 140 makes contact with the adjustable screw 148 closing the electrical circuit of the switch 138 and causing the bulb 134 to flash. The extended length of the sleeve 60' imparts additional resilience to the center portion of the sleeve in the vicinity of the sleeve openings 62. The length of the sleeve 60' is inversely proportional to the force with which the fish must pull on the fishing line 96 in order for the bulb 134 to flash. If more sensitivity is desired so that the nibblings of smaller fish can be detected, the length of the sleeve 60' could be increased. Likewise, the screw 148 can be adjusted so that it is in closer proximity to the copper staple 140 if more sensitivity is desired. Thus, the fisherman is informed when a fish nibbles the baited hook 100 by observing a flash of the light bulb 134 on the fishing float 10'. The low voltage of the penlight batteries 130 precludes the occurrence of any short circuits, even when the switch 138 becomes wet.

It should be understood that the foregoing relates only to preferred embodiments of the present invention and that numerous modifications or alterations may be made without departing from the spirit and scope of the invention as set forth in the appended claims.

I claim:

1. A fishing float attached to a fishing line controlled by a fisherman, said fishing float comprising:
    (a) a buoyant base having an upper portion and a lower portion;
    (b) a cavity within the upper portion of said base;
    (c) weight means mounted to the lower portion of said base so that the base tends to float in an upright attitude;
    (d) a hollow tube for receiving the fishing line and guiding the fishing line into said cavity, said hollow tube being suspended on said float vertically above said cavity;
    (e) locking means pivotably mounted within said cavity, said locking means selectively engaging the fishing line and being normally in a locked position which prevents the fishing line from upward and downward movement;
    (f) said locking means operating to release the fishing line in response to a first pulling force on the fishing line by the fisherman; and
    (g) said locking means operating to relock the fishing line in response to a second pulling force on the fishing line,
    wherein said fishing line passes through said hollow tube and in operative relation with said locking means so that, when said first pulling force is exerted on said fishing line by the fisherman, said locking means will release the fishing line allowing said line to pass upwardly and downwardly through said locking means freely.

2. The fishing float of claim 1, wherein said locking means comprises:
    (a) a brake shaft mounted within said cavity so that said brake shaft is substantially perpendicular to said hollow tube; and
    (b) an opening passing through said brake shaft perpendicular to the axis of pivot, said opening being normally out of alignment with respect to said tube in a locked position,
    wherein, when said first pulling force is exerted on said fishing line by the fisherman, said opening comes into alignment with said hollow tube in an unlocked position, allowing said fishing line to pass freely through said opening.

3. The fishing float of claim 1, wherein said locking means comprises:
    (a) a brake shaft mounted within said cavity so that said brake shaft is substantially perpendicular to said hollow tube;
    (b) an opening passing through said brake shaft, said opening being normally out of alignment with respect to said tube in a locked position; and
    (c) a buoyant arm mounted to said brake shaft, said arm normally floating in a first position which places said brake shaft in the locked position,
    wherein, when said first pulling force is exerted on said fishing line by a fisherman, said buoyant base deviates from said upright attitude and said buoyant arm moves from the first floating position to a second floating position which places the brake shaft in an unlocked position causing said opening to come into alignment with said hollow tube in an unlocked position, allowing said fishing line to pass freely through said opening.

4. A fishing float floating on the surface of a body of water and slidably attached to a fishing line controlled by a fisherman, said fishing float comprising:
    (a) a buoyant base having an upper portion and a lower portion, the lower portion of said base being normally submerged;
    (b) a cavity within the upper portion of said base;
    (c) weight means mounted to the lower portion of said base so that said base tends to float in an upright attitude;
    (d) a hollow tube for receiving the fishing line and guiding the fishing line into said cavity, said hollow tube having an upper portion and a lower portion, the lower portion of said tube being suspended on said float vertically above said cavity;
    (e) a brake shaft pivotally mounted within said cavity so that said brake shaft is substantially perpendicular to said lower portion of said hollow tube, said brake shaft pivoting between a locked and an unlocked position;
    (f) an opening passing through said brake shaft perpendicular to the axis of pivot, said opening being normally out of alignment with respect to said tube when said brake shaft is in a locked position; and
    (g) a buoyant arm mounted to said brake shaft, said buoyant arm normally being in a first position floating on the surface of the water when said brake shaft is in a locked position,
    wherein said fishing line passes down through said hollow tube and through said opening in said brake shaft so that, when a pulling force is exerted on said fishing line by said fisherman, said buoyant arm will be removed from said surface of said water causing said brake shaft to pivot to an unlocked position so that said opening becomes aligned with said tube allowing said line to pass through said opening freely.

5. The fishing float of claim 4, wherein said upper portion of said hollow tube is laterally displaced from the lower portion of said hollow tube so that, when a pulling force is exerted upon said fishing line, said upper portion of said hollow tube causes said fishing float to turn in a direction toward said fisherman.

6. The fishing float of claim 4, wherein said upper portion of said hollow tube faces in a direction away from said buoyant arm so that when said brake shaft is in an unlocked position, a predetermined length of said fishing line can pass freely through said opening.

7. The fishing float of claim 6, wherein said lower portion of said hollow tube is rotatably mounted above said cavity allowing said tube to be rotated to a position wherein said upper portion of said tube is oriented above said buoyant arm.

8. The fishing float of claim 4, wherein said upper portion of said hollow tube is oriented above said buoyant arm so that when said brake shaft is in an unlocked position, said fishing line can pass freely through said opening until a second pulling force is exerted on said fishing line by said fisherman.

9. The fishing float of claim 8, wherein said lower portion of said hollow tube is rotatably mounted above said cavity allowing said tube to be rotated to a position wherein said upper portion of said tube faces away from said buoyant arm.

10. The fishing float of claim 9, wherein:
   (a) said upper portion of said tube is hinged to said tube, said hinge being closed when said upper member of said tube is linearly aligned with said tube; and
   (b) said upper portion of said tube is attached to said buoyant arm by a resilient thread of a predetermined length, said thread being taut when said hinge is closed,
   wherein said hinge may be closed by having said fisherman exert a pulling force on said fishing line causing said thread to become taut and further causing said buoyant arm to move upwardly so that said brake shaft assumes a locked position, preventing the passage of said fishing line through said opening.

11. The fishing float of claim 9, wherein said upper portion of said hollow tube is hinged to said tube, said hinge being closed when said upper portion is linearly aligned with said tube.

12. The fishing float of claim 11, further comprising a guide pin mounted in said lower portion of said base, wherein the weight of said guide pin relocates the center of gravity of said float and thereby prevents the accidental relocking of said brake shaft.

13. A fishing float floating on the surface of a body of water and slidably attached to a fishing line controlled by a fisherman, said fishing float comprising:
   (a) a buoyant base having an upper portion and a lower portion, the lower portion of said base being normally submerged;
   (b) a cavity within the upper portion of said base;
   (c) a battery mounted to the lower portion of said base so that said base tends to float in an upright attitude;
   (d) a flexible shaft mounted within said cavity for suspending said fishing line within said cavity;
   (e) a metal contact mounted to said shaft;
   (f) switch means mounted within said cavity below said flexible shaft in proximity to said metal contact, said switch means being electrically connected to said battery; and
   (g) light means mounted on said upper portion of said base, said light means being electrically connected to said metal contact,
   so that, when a fish pulls on said fishing line, said flexible shaft is pulled downwardly causing said metal contact to contact said switch means, causing said light to flash.

14. A fishing float attached to a fishing line controlled by a fisherman, said fishing float comprising:
   (a) a buoyant base having an upper portion and a lower portion;
   (b) a cavity within the upper portion of said base;
   (c) weight means mounted to the lower portion of said base so that the base tends to float in an upright attitude;
   (d) a hollow tube for receiving the fishing line and guiding the fishing line into said cavity, said hollow tube being suspended on said float vertically above said cavity;
   (e) locking means pivotably mounted within said cavity, said locking means selectively engaging the fishing line and being normally in a locked position which prevents the fishing line from upward and downward movement;
   (f) said locking means operating to release the fishing line in response to a pulling force on the fishing line;
   (g) said locking means comprising a brake shaft mounted within said cavity so that said brake shaft is substantially perpendicular to said hollow tube;
   (h) an opening passing through said brake shaft, said opening being normally out of alignment with respect to said tube in a locked position; and
   (i) a buoyant arm mounted to said brake shaft, said arm normally floating in a first position which places said brake shaft in the locked position,
   wherein, when a pulling force is exerted on said fishing line by a fisherman, said buoyant base deviates from said upright attitude and said buoyant arm moves from the first floating position to a second floating position which places the brake shaft in an unlocked position causing said opening to come into alignment with said hollow tube in an unlocked position, allowing said fishing line to pass freely through said opening.

* * * * *